W. L. FROST.
COTTON-PRESS.
No. 170,075. Patented Nov. 16, 1875.
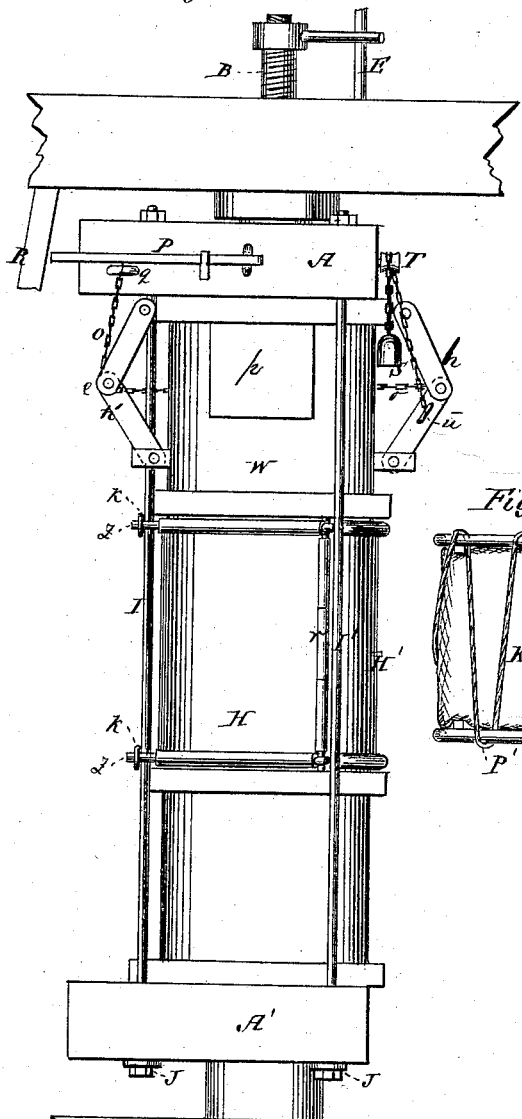
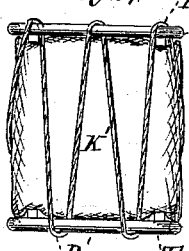
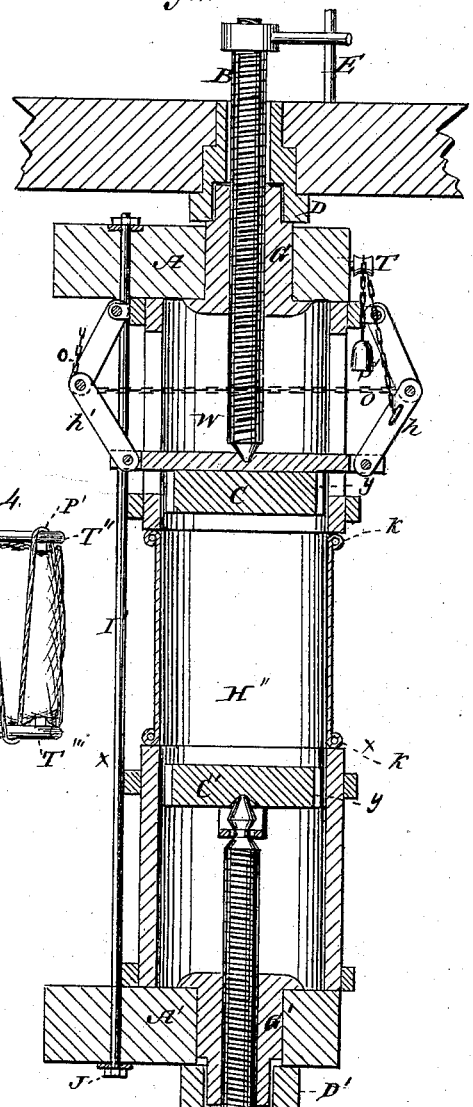
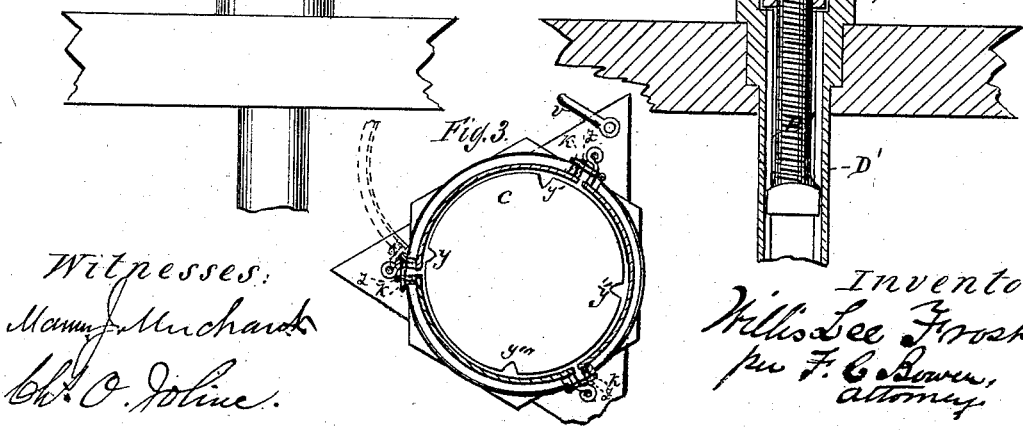

UNITED STATES PATENT OFFICE.

WILLIS LEE FROST, OF SHERMAN, TEXAS.

IMPROVEMENT IN COTTON-PRESSES.

Specification forming part of Letters Patent No. 170,075, dated November 16, 1875; application filed April 19, 1875.

*To all whom it may concern:*

Be it known that I, WILLIS LEE FROST, of Sherman, in the county of Grayson and State of Texas, have invented certain new and useful Improvements in Cotton-Presses; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to certain improvements in that class of cotton-presses in which the followers are arranged to move in a revolving press-box, being forced together or drawn apart by stationary right and left screws at will by revolving the box in either direction, as may be desired.

The object of the invention is to provide a press by means of which the cotton can be backed and pressed into the bale in small quantities at a time, by alternating pressing a quantity, then lifting the follower, and inserting more, and pressing again, and so on until the bale is formed.

My invention consists, first, in the combination, with the upper follower operated by a right-hand screw, the end of which simply bears against said follower, of a series of toggle-joint levers, operated by a chain and lever in such manner, as the press-box is rotated to release the pressure when it is desired to introduce a fresh quantity of cotton, so as to keep that portion already pressed from assuming its original bulk by reason of its elasticity; said levers also serve to raise the upper follower as occasion requires, as hereinafter more fully described; and, second, in the combination, with the upper follower, operated as described, of a lower follower, operated by a stationary left-hand screw, arranged to work in a screw-nut and a grooved vertical race below, as fully hereinafter set forth; third, in the combination, with the press, as described, of two baling-rings, adapted to fit within the box, in combination with a cord or chain for securing the bale therein, substantially as hereinafter set forth.

In the drawings, Figure 1 represents an elevation of my improved apparatus; Fig. 2, a vertical section of the same; Fig. 3, a horizontal section through the line $x\ x$; and Fig. 4, the bale after it has been tied and removed from the press.

The letters A A' represent the head-blocks, in which the nuts G G' are fastened, provided with right and left screw-threads, and through which the right and left hand screws B B' extend. Said blocks are rigidly attached to the press-box, and, in turning, force the screws and followers together, or draw them apart, according to the direction in which the box is moved, the lower screw being kept from turning by a feather on its head setting in the race D, the upper screw, by means of an adjustable cross-bar, passing through its top, which engages a pin or stop, E, attached to the frame of the apparatus. The end of the upper screw B simply sets against the follower C, the end of the lower screw being swiveled to the follower C, in order to carry it in both directions. The press-box consists of three sections, the upper and lower sections consisting of cylindrical casings, of proper material and size, the intermediate section consisting of segmental sections, confined together, by means of bolts, in such manner that they can be taken apart, when desired, for the purpose of removing the bale. The upper and lower sections are rigidly attached to the head-blocks A A', which are secured together by means of longitudinal stays I I' I'. The intermediate section is hinged to two of said stays, leaving the ends of two of the segmental sections which compose it free, forming doors, by means of which the cotton may be inserted or the bale removed. *h* and *h'* represent two toggle-joint levers, arranged on each side of the upper section of the press-box, pivoted at their upper ends to the head-block A, and at their lower ends to lugs on opposite sides of the upper follower C, extending through vertical slots in the upper section of the press-box. To the elbow of the lever *h* is secured the end of a chain, O, which passes transversely through the upper section of the press-box, and under a pulley at the elbow of the lever *h'*, and from thence to a lever, P, pivoted at one end to the upper head-block A, passing through a loop, *q*, attached to said head-block. To the lever *h* is also attached a weighted chain, *u*, which passes over a pulley, T, the object of which will be hereinafter explained. P' P' represent two bale-rings, to be placed below and on top of the cotton in the press; and K', a cord for binding them together to secure the bale.

The operation of my apparatus is as follows: The press-box is rotated in such direction as to force the lower follower to the upper end of the lower section of the same. The cross-bar in the head of the screw B is then thrown out of contact with the stop E, and the screw B elevated, by hand, until its end is flush with the lower end of the nut G. The follower is then elevated by drawing the toggle-levers apart. This is done automatically by the weighted cord S, attached to the lever $h$, and passing over the pulley T, which elevates said lever, when the end of the screw B is removed from the follower, throwing the toggle-levers $h$ and $h'$ apart, as will be perceived. One of the pressing-rings, P', is then placed on the lower follower, and a sufficient quantity of cotton placed upon it, and the other ring is placed upon top of it. The doors H H must have been previously opened for the purpose, and after sufficient cotton has been filled in they are closed and locked. The press-box is then turned in proper direction to force the followers together, which is done by power applied to a rope or chain attached to a loop, $v$, on the head-blocks. When pressed to the utmost the press-box is turned in the opposite direction. This, by drawing the screws apart, relieves the pressure on the cotton; but at the instant the pressure is released the lever P, to which the chain O of the toggle-levers is attached, engages an adjustable stop, R, attached to the frame, in which the press-box revolves, and, by pressing it away from the head-block, draws the levers together, causing the upper follower to follow the bale as the lower follower recedes, and prevent the same from assuming its natural position until fresh material is added. This is accomplished by again elevating the screw B and the follower C, as before described, one of the doors of the intermediate section being opened. The rings P' and P' being loosely bound by the rope K', the ring P' may be readily lifted for the purpose, the cotton being inserted between the ropes. The operation is then continued as before, and repeated until the bale is completed, after which it is tied, as shown in Fig. 4, and removed.

Having thus described my invention, what I claim, and desire to secure by Letters Patent, is—

1. The follower C, operated by a right-hand screw, B, in combination with toggle-joint levers $h$ $h'$, operated by chains O and lever P, to cause the follower C to follow the bale as the follower C' recedes, for the purpose of preventing the bale from becoming impacked, substantially as described.

2. In combination with the follower C and toggle-levers $h$ and $h'$, the weighted chain S, attached to the lever $h$, and passing over pulley T, for the purpose of elevating the follower C, substantially as described.

In testimony that I claim the foregoing I have hereunto set my hand this 21st day of March, 1874.

WILLIS LEE FROST.

Witnesses:
J. C. DONALDSON,
S. O. DOANE.